United States Patent [19]
Pinkston

[11] Patent Number: 5,288,181
[45] Date of Patent: Feb. 22, 1994

[54] RETHREADING TOOL

[76] Inventor: Donald L. Pinkston, 12295 Spruce La., Perry, Mich. 48872

[21] Appl. No.: 52,520

[22] Filed: Apr. 29, 1993

[51] Int. Cl.$^5$ ............................................... B23G 5/00
[52] U.S. Cl. .................................... 408/1 R; 408/221; 470/207
[58] Field of Search ............... 408/1 R, 120, 123, 215, 408/216, 221; 470/9, 10, 11, 67, 183, 185, 207

[56] References Cited

U.S. PATENT DOCUMENTS

| | | | |
|---|---|---|---|
| 378,830 | 2/1888 | Engels et al. | 470/207 |
| 522,471 | 7/1894 | Kohler | 470/207 |
| 1,085,762 | 2/1914 | Smith. | |
| 1,382,841 | 6/1921 | Lynn. | |
| 1,392,705 | 10/1921 | Rhodes. | |
| 2,700,166 | 1/1955 | McKenzie. | |
| 2,718,646 | 9/1955 | McKenzie. | |
| 3,956,787 | 5/1976 | Crumpacker. | |
| 4,572,032 | 2/1986 | Kinzler | 408/221 |
| 4,630,978 | 12/1986 | Keiser et al. | |

Primary Examiner—Daniel W. Howell
Attorney, Agent, or Firm—Ian C. McLeod

[57] ABSTRACT

A rethreading tool (10) for reconditioning and rethreading the threads (62) of a stud (60) is described. The tool includes a moveable jaw (26) having an extension (26A) pivotably mounted into a slot 24 of a fixed jaw (16). The extension and a first portion (16A) of the fixed jaw form a cam surface (40) which is activated by a cam nut (56) to move the moveable jaw toward the fixed jaw after positioning of the tool around the stud. Upon closing, the jaws form a complete circular opening (42) which contains a complete circular thread die (48) formed from a first thread die (22) in the fixed jaw and a second thread die (46) in the moveable jaw. In use, the tool is placed over the threads of the stud and the jaws are moved into the closed position such that the complete thread die is adjacent the threads of the stud. The tool is then rotated off of the stud.

32 Claims, 3 Drawing Sheets

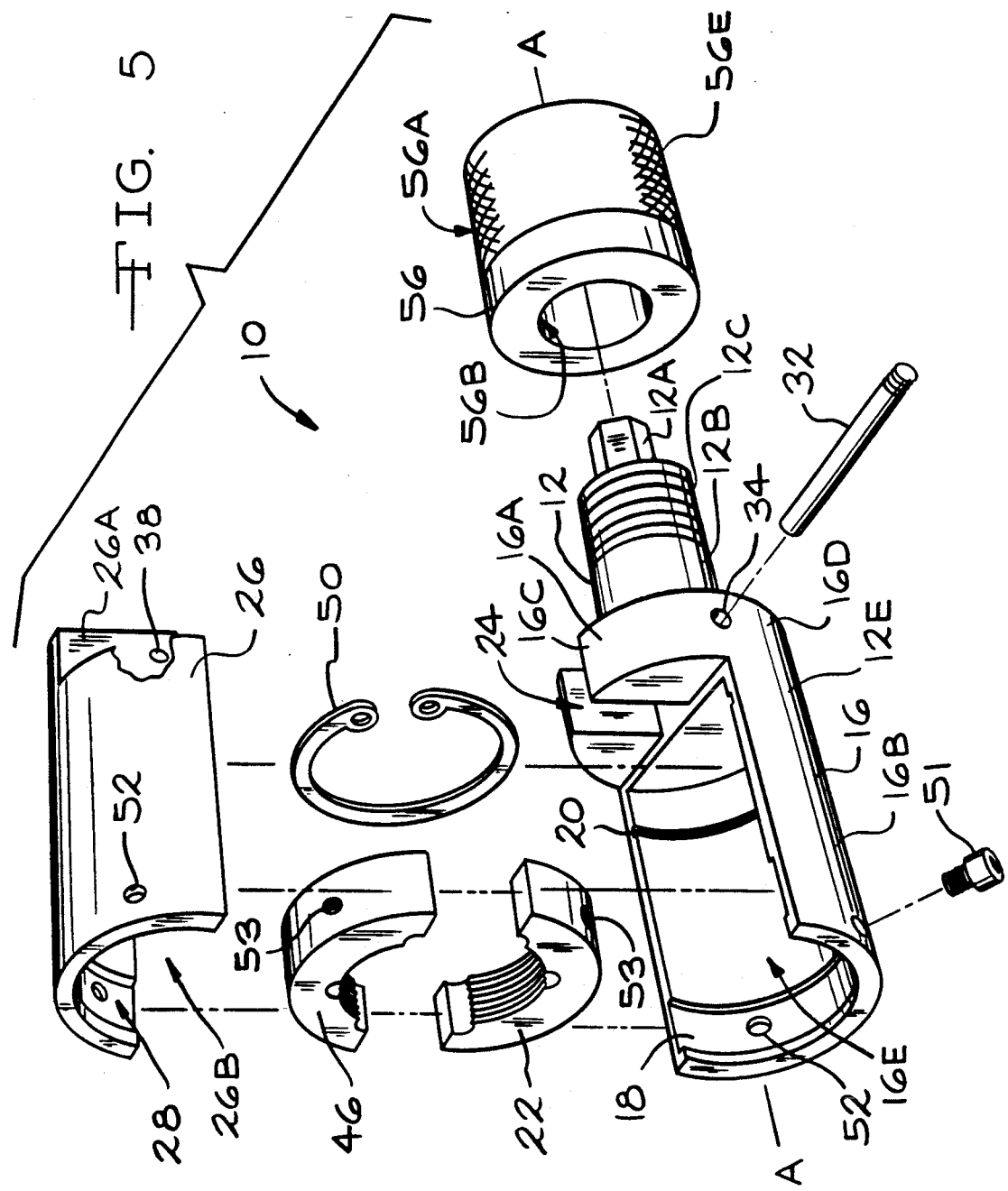

RETHREADING TOOL

BACKGROUND OF THE INVENTION

1. Field of the Invention

The present invention relates to a tool for reconditioning and rethreading the threads of a threaded stud. In particular, the invention relates to a tool which has a moveable jaw which allows for easy mounting of the tool onto the stud and a cam surface actuated by a rotating cam nut which moves the moveable jaw toward the threaded stud to accurately position the tool onto the threads of the stud.

2. Prior Art

Rethreading tools which have separable rethreading dies to allow mounting onto the studs are well-known. Several different methods have been used to expand and contract the thread dies for positioning of the rethreading tools. Illustrative are U.S. Pat. Nos. 1,085,762 to Smith; 1,382,841 to Lynn; 1,392,705 to Rhodes; 2,700,166 to McKenzie; 2,718,646 to McKenzie; 3,956,787 to Crumpacker; and 4,630,978 to Keiser et al.

One such method is the use of an outer sleeve to surround the expanded threading dies thus moving the dies into the contracted position. Illustrative of this method is Keiser et al. Keiser et al describes a tool in which the threading dies are rockably mounted between the inner and outer sleeve. To move the threading dies outward the outer sleeve is pulled back which causes a caming acting between the outside sleeve and the die elements which rocks the dies elements into the expanded position. To contract the threading dies after insertion of the stud, the outer sleeve is repositioned over the threading dies by a spring thus moving the threading dies inward and into engagement with the threads of the stud. Also, illustrative of tools using this method to expand and contract the threading area are Rhodes and Crumpacker.

These tools however are not easy to position into the threads of a stud. In addition, the threading dies are rigid and do not allow for accurate positioning onto the threads with minimal effort. Thus, there remains a need for a device which is easy to use and which can be accurately positioned over the threads of a stud.

OBJECTS

It is therefore an object of the present invention to provide a rethreading tool which has a moveable jaw and a fixed jaw which allows for expansion of the thread die for easy mounting of the tool onto a threaded stud. It is further an object of the present invention to provide a rethreading tool in which the moveable and fixed jaws form a cam surface which upon rotation of a cam nut into contact with the cam surface moves the moveable jaw toward the fixed jaw. Further, it is an object of the present invention to provide a tool which can be accurately and precisely mounted within the threads of a stud in order to achieve a matched rethread. Still further, it is an object of the present invention to provide a tool which can be easily and accurately mounted within the inner most unused threads of a stud to ensure a better rethreading match. Finally, it is an object of the present invention to provide a tool which is easy to manufacture, uncomplicated and easy to use.

BRIEF DESCRIPTION OF THE DRAWINGS

FIG. 5 is a separated view of the rethreading tool 10 showing the extension 26A of the moveable jaw 26, the slot 24 of the fixed jaw 16, the pin 32 for pivotably mounting the jaws 16 and 26 together, the four screws 51 and the C-clip 50.

DESCRIPTION OF THE PREFERRED EMBODIMENTS

Figure 1:
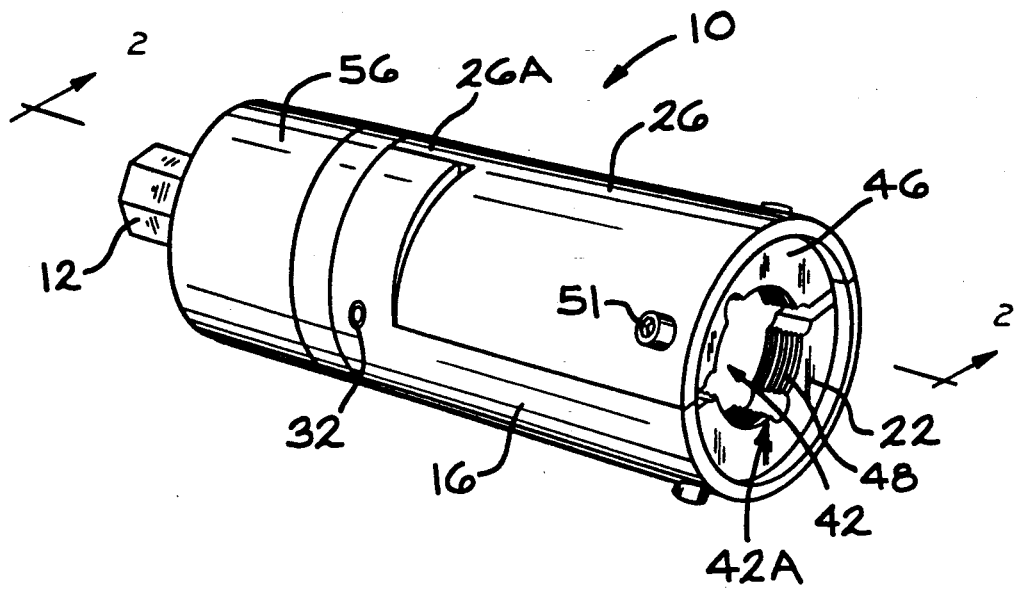
FIG. 1 is a perspective view of the rethreading tool 10 of the present invention.

The present invention relates to a rethreading tool for a threaded member, which comprises: a shaft having a proximal end and a distal end spaced apart along a longitudinal axis of the shaft; a cam actuating means mounted around the shaft along the longitudinal axis of the shaft; a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft; a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis when the fixed jaw and the moveable jaw are mated together, wherein the moveable jaw has a cam surface adjacent to where the moveable jaw is pivotally mounted to the fixed jaw which is oriented towards the proximal end of the shaft and away from the distal end of the shaft so that the cam surface is engageable by the cam actuating means to bring the moveable jaw together with the fixed jaw; and thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening and the tool can be rotated on the threaded member.

Furthermore, the present invention relates to a rethreading tool for a threaded member which comprises: a shaft having a proximal end and a distal end spaced apart along a longitudinal axis of the shaft with threads along the shaft; a rotatable member with internal threads mounted on the threads of the shaft; a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft; a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis of the shaft when the fixed jaw and the moveable jaw are mated together, wherein the moveable jaw has a cam surface adjacent to where the moveable jaw is pivotally mounted to the fixed jaw which is oriented towards the proximal end of the shaft and away from the distal end of the shaft so that the cam surface is engageable by the rotatable member to bring the moveable jaw together with the fixed jaw; and thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening and the tool can be rotated on the threaded member.

In particular, the present invention relates to a rethreading tool for a threaded member which comprises: a shaft having a proximal end and a distal end spaced apart along a longitudinal axis of the shaft and with threads along the shaft and with an enlarged portion providing a part of a fixed jaw at the distal end of the shaft having a part of an opening along and around the longitudinal axis; a rotatable member with internal threads mounted on the threads on the shaft; a moveable jaw pivotally mounted on the shaft with a part of an opening which mates together with the part of an opening of the enlarged portion of the shaft to provide a complete opening around the longitudinal axis when the jaws and enlarged portion are mated together, wherein the moveable jaw has a cam surface adjacent to where the jaw is pivotally mounted which is oriented towards the proximal end of the shaft and away from the enlarged portion of the shaft so that the cam portion is engageable by the rotatable member to bring the moveable jaw together with the enlarged portion; thread dies mounted in the part of the opening of the enlarged portion of the shaft and the part of the opening of the moveable jaw around the longitudinal axis of the shaft so that the dies rethread the threaded member when the enlarged portion of the shaft and moveable jaw are mated together to form the complete opening and the tool can be rotated on the threaded member; and resilient means mounted in the part of the openings of the moveable jaw and enlarged portion of the shaft which bias the moveable jaw away from the enlarged portion of the shaft when the rotatable member is disengaged from the cam portion.

The present invention also relates to a method for rethreading the threads of a threaded member, which comprises: a shaft having a proximal end and a distal end spaced apart along a longitudinal axis of the shaft; a cam actuating means mounted around the shaft along the longitudinal axis of the shaft; a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft; a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis when the fixed jaw and the moveable jaw are mated together, wherein the moveable jaw has a cam surface adjacent to where the moveable jaw is pivotally mounted to the first jaw which is oriented towards the proximal end of the shaft and away from the distal end of the shaft so that the cam surface is engageable by the cam means to bring the moveable jaw together with the fixed jaw; and thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening; mounting the rethreading tool on the threaded member; rotating the cam means toward the cam surface of the moveable jaw to position the complete opening formed by the fixed jaw and the moveable jaw and the thread dies around the threaded member; and rotating the rethreading tool around the threaded member to rethread the threads of the threaded member.

Finally, the present invention relates to a method for reconditioning and rethreading the threads of a threaded member, which comprises: providing a rethreading tool including a shaft having a proximal end and a distal end spaced apart along a longitudinal axis of the shaft with threads along the shaft; a rotatable member with internal threads mounted on the threads of the shaft; a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft; a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis when the fixed jaw and the moveable jaw are mated together, wherein the moveable jaw has a cam surface adjacent to where the moveable jaw is pivotally mounted to the fixed jaw which is oriented towards the proximal end of the shaft and away from the distal end of the shaft so that the cam surface is engageable by the rotatable member to bring the moveable jaw together with the fixed jaw; and thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening; mounting the rethreading tool on the threaded member; rotating the rotatable member toward the cam surface of the moveable jaw to position the complete opening formed by the fixed jaw and the moveable jaw and the thread dies around the threaded member; and rotating the rethreading tool around the threaded member to rethread the threads of the threaded member.

The fixed and moveable jaws are preferably provided with inner and outer semi-circular grooves. The grooves form annular grooves when the jaws are in the completely closed position to securely mount a C-clip and a thread die within the opening of the tool. The proximal end of the shaft preferably has a hexagonal cross-section to allow for turning of the tool by a wrench to remove the tool from the stud.

Figure 2:
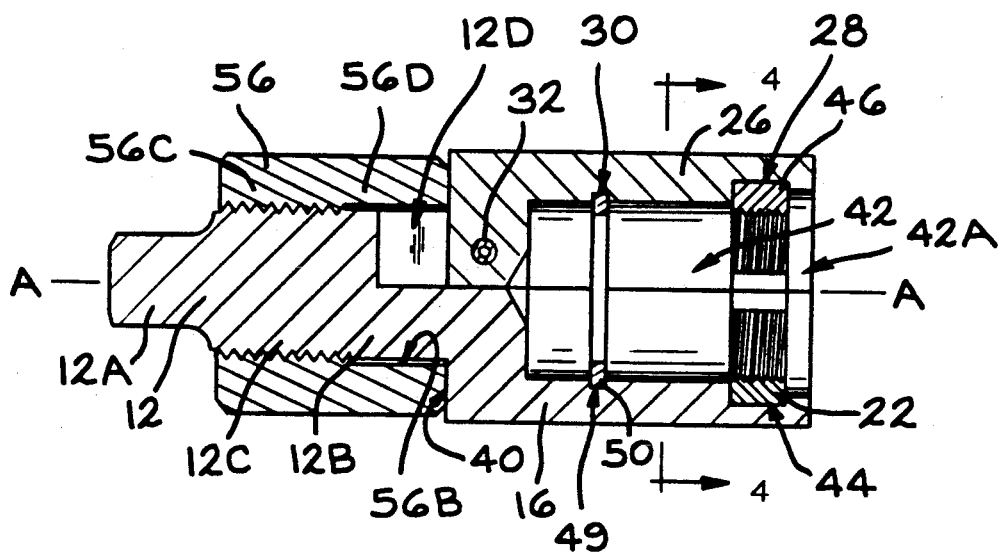
FIG. 2 is a cross-sectional view along the line 2—2 of FIG. 1 showing the tool 10 in the completely closed position with the cam nut 56 adjacent the cam surface 40 formed by the fixed jaw 16 and the moveable jaw 26.
Figure 3:
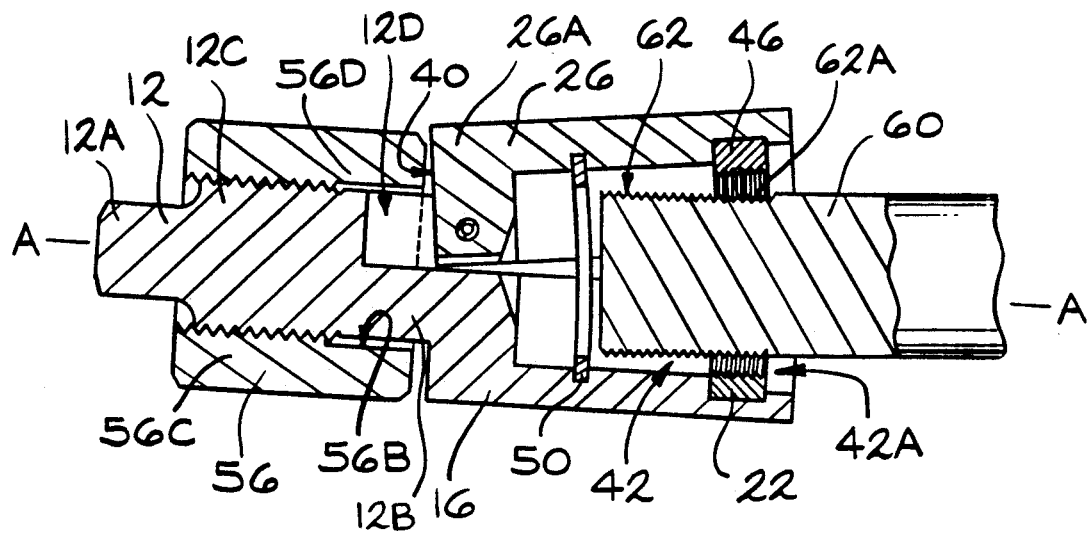
FIG. 3 is a cross-sectional view of the tool 10 in the open position around a stud 60, particularly showing the thread dies 46 and 22 positioned within the inner threads 62A of the stud 60.

FIGS. 1 to 5 show the rethreading tool 10 of the present invention. The tool 10 is comprised of a shaft 12, a cam nut 56 mounted onto the shaft 12, a fixed jaw 16 and a moveable jaw 26. In the preferred embodiment, the tool 10 is constructed from metal although other materials would also work. The shaft 12 has a proximal end 12A and a distal end 12B with a threaded segment 12C therebetween. The proximal end 12A of the shaft 12 preferably has a hexagonal cross-section in order to allow the tool 10 to be turned by a wrench (not shown). The distal end 12B of the shaft 12 is provided with a semi-circular recess 12D perpendicular to the axis A—A (FIGS. 2 and 3). The distal end 12B of the shaft 12 is also provided with an enlarged portion 12E which forms the fixed jaw 16 of the tool 10 (FIG. 5). Although in the preferred embodiment, the fixed jaw 16 and shaft 12 are formed in a single integral piece, it is understood that the fixed jaw 16 could be a separate piece mounted onto the distal end 12A of the shaft 12.

The fixed jaw 16 is comprised of a first portion 16A and a second portion 16B with the first portion 16A adjacent to the distal end 12B of the shaft 12 and the second portion 16B extending outward from the first portion 16A along the axis A—A (FIG. 5). The first portion 16A preferably has a circular cross-section around the axis A—A and is divided into a top section 16C and a bottom section 16D. The diameter of the first portion 16A is preferably greater than the diameter of the distal end 12B of the shaft 12. The second portion 16B of the fixed jaw 16 extends outward from the bottom section 16D of the first portion 16A and preferably has a semi-circular cross-section around the axis A—A. The second portion 16B of the fixed jaw 16 is provided with a first semi-circular channel 16E along the axis A—A extending the entire length of the second portion 16B (FIG. 5). The first semi-circular channel 16E provides the first part of the complete circular opening 42 of the tool 10. As shown in FIG. 5, the first semi-circular channel 16E of the second portion 16B of the fixed jaw 16 is provided with a first outer semi-circular groove 18 and a first inner semi-circular groove 20. In the preferred embodiment, the first outer semi-circular groove 18 is located adjacent the end of the second portion 16B opposite the first portion 16A of the fixed jaw 16. Preferably, the first inner semi-circular groove 20 is spaced apart from the first outer groove 18 toward the first portion 16A of the fixed jaw 16. The width and depth of the first outer groove 18 is such as to accommodate first thread dies 22 which are mounted within the first outer groove 18 of the second portion 16B of the fixed jaw 16 (FIG. 1). The first inner semi-circular groove 20 is preferably smaller in width and depth than the first outer semi-circular groove 18 and allows for partially mounting a C-clip 50 within the second portion 16B of the fixed jaw 16 (FIG. 5).

The top section 16C of the first portion 16A of the fixed jaw 16 is provided with a slot 24 which extends through the entire top section 16C of the first portion 16A parallel to the axis A—A from the outer perimeter of the first portion 16A to the center of the first portion 16A (FIG. 5). The width and depth of the slot 24 are identical with the diameter and depth of the semi-circular recess 12D of the distal end 12B of the shaft 12. The width of the slot 24 and the recess 12D is such as to accommodate an extension 26A of the moveable jaw 26.

The moveable jaw 26 is mounted onto the top section 16C of the first portion 16A of the fixed jaw 16 and extends outward from the first portion 16A of the fixed jaw 16 along the axis A—A. In the preferred embodiment, the moveable jaw 26 is shaped similar to the second portion 16B of the fixed jaw 16 and has a semi-circular cross-section around the axis A—A similar to the second portion 16B of the fixed jaw 16. The moveable jaw 26 is provided with an extension 26A on the end of the moveable jaw 26 adjacent the first portion 16A of the fixed jaw 16. The extension 26A of the moveable jaw 26 is of a size as to be mounted within the slot 24 of the top section 16C of the first portion 16A of the fixed jaw 16. As shown in FIG. 5, the extension of the moveable jaw 26 is pivotally secured into the slot 24 of the fixed jaw 16 by a pin 32 mounted perpendicular to the axis A—A. The pin 32 extends through a first aperture 34 in the top section 16C of the first portion 16A of the fixed jaw 16 and through a second aperture 38 in the extension 26A of the moveable jaw 26 and into a third aperture (not shown) located in the fixed jaw 16 on the opposite side of the slot 24 as the first aperture 34. In the preferred embodiment, the pin 32 does not extend outward beyond the first and third apertures 34 of the top section 16C of the first portion 16A of the fixed jaw 16. The pin 32 secures the extension 26A of the moveable jaw 26 within the slot 24 of the fixed jaw 16 such that the end of the moveable jaw 26 opposite the first portion 16A of the fixed jaw 16 can pivot upward away from the second portion 16B of the fixed jaw 16. The projection of the extension 26A beyond the slot 24 of the fixed jaw 16 toward the proximal end 12A of the shaft 12 together with the first portion 16A of the fixed jaw 16 forms a cam surface 40 which acts to move the moveable jaw 26 adjacent to the fixed jaw 16 upon tightening of the cam nut 56 onto the cam surface 40 (to be described in detail hereinafter).

Similar to the second portion 16B of the fixed jaw 16, the moveable jaw 26 has a second semi-circular channel 26B along the axis A—A extending the length of the moveable jaw 26. The moveable jaw 26 is mounted on the fixed jaw 16 such that when the moveable jaw 26 is in complete closed contact with the second portion 16B of the fixed jaw 16, the first semi-circular channel 16E of the second portion 16B of the fixed jaw 16 and the second semi-circular channel 26B of the moveable jaw 26 form a complete circular opening 42 along and around the axis A—A (FIG. 1). The entrance 42A of the complete circular opening 42 is located in the end of the fixed and moveable jaws 16 and 26 opposite the shaft 12. The complete circular opening 42 terminates adjacent the first portion 16A of the fixed jaw 16.

Figure 4:
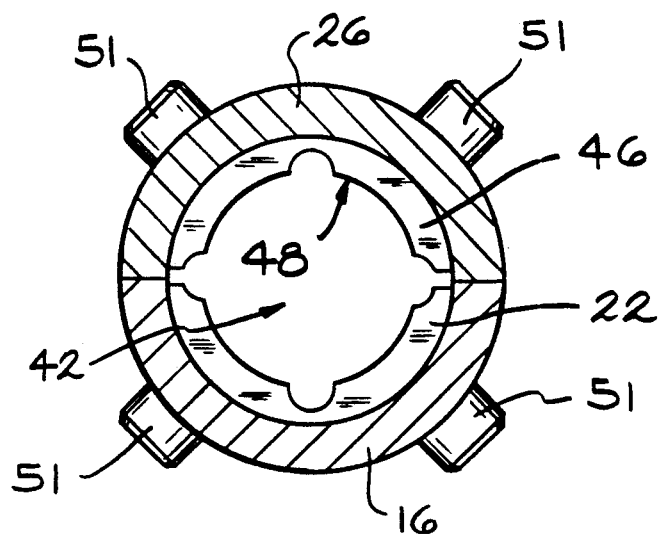
FIG. 4 is an end view along line 4—4 of FIG. 2 showing the complete circular opening 42 and the complete circular thread die 48.

The second semi-circular channel 26B of the moveable jaw 26 is provided with a second outer semi-circular groove 28 and a second inner semi-circular groove 30 (FIG. 2). In the preferred embodiment, the second outer groove 28 is located adjacent the end of the moveable jaw 26 which is adjacent the entrance 42A of the complete circular opening 42. The second inner groove 30 is spaced apart from the second outer groove 28 toward the first portion 16A of the fixed jaw 16. The location of the second outer groove 28 is such that when the moveable jaw 26 is in complete closed contact with the fixed jaw 16, the first outer semi-circular groove 18 of the second portion 16B of the fixed jaw 16 and the second outer semi-circular groove 28 of the moveable jaw 26 form an annular outer groove 44 adjacent the entrance 42A of the complete circular opening 42 (FIG. 1). The depth and width of the second outer semi-circular groove 28 of the moveable jaw 26 is similar to that of the first outer semi-circular groove 18 of the fixed jaw 16 such that second thread dies 46 can be mounted within the second outer semi-circular groove 28 to mate with the first thread dies 22 of the fixed jaw 16 to form a complete circular thread die 48 adjacent the entrance 42A of the complete circular opening 42 (FIGS. 2 and 4). In the preferred embodiment, the first and second thread dies 22 and 46 are separate dies, each forming approximately one half of the complete circular thread die 48. The width of the dies 22 and 46 is preferably similar to the width of the annular outer groove 44 such that the dies 22 and 46 can be easily mounted within the annular outer groove 44 but do not move substantially in either direction along the axis A—A. In the preferred embodiment, the thread dies 22 and 46 have a circumference slightly less than the circumference of the annular outer groove 44 such that when the tool 10 in the completely closed position, the first thread die 22 and the second thread die 46 are spaced apart from each other around the axis A—A. Preferably, the first and second thread dies 22 and 46 are formed from a single standard circular die normally used for rethreading purposes. In the preferred embodiment, the first and second thread dies 22 and 46 are secured within the annular outer groove 44 by four screws 51 (FIG. 4). The screws 51 are first inserted into first holes 52 on the fixed jaw 16 and moveable jaw 26 and then into second holes 53 in the first and second thread dies 22 and 46 (FIG. 5). Preferably, the screws 51 are allen head screws and are of a length such as to extend through the jaws 16 and 26 and into the thread dies 22 and 46 but not as to extend completely through the thread dies 22 and 46 (FIG. 1).

The location of the second inner groove 30 is such that when the moveable jaw 26 is in complete closed contact with the fixed jaw 16, the first and second inner semi-circular grooves 20 and 30 mate to form an annular inner groove 49 (FIG. 2). The second inner semi-circular groove 30 of the moveable jaw 26 is of similar depth and width as the first inner semi-circular groove 20 of the second portion 16B of the fixed jaw 16 such that the C-slip 50 (FIG. 5) can be securely mounted within the annular inner groove 49. In the preferred embodiment, the C-clip 50 has a diameter such that when the tool 10 is in the completely closed position, the C-clip 50 is being compressed. Although preferably a C-clip 50 is used, any other resilience device may be used in order to bias the moveable jaw 26 away from the fixed jaw 16 upon release of the cam nut 56.

The cam nut 56 is mounted onto the threaded segment 12C of the shaft 12. The cam nut 56 has an outer surface 56A and an inner surface 56B. The diameter of the inner surface 56B of the cam nut 56 is slightly larger than the outer diameter of the shaft 12 such that the cam nut 56 can easily slip over the shaft 12. As shown in FIGS. 2 and 3, the inner surface 56B of the cam nut 56 is provided with a threaded portion 56C and an unthreaded portion 56D. The cam nut 56 is mounted on the shaft 12 such that the threaded portion 56C of the cam nut 56 threadably mates with the threaded segment 12C of he shaft 12 while the unthreaded portion 56D of the cam nut 56 extends beyond the threaded portion 56C of the cam nut 56 along the axis A—A toward the distal end 12B of the shaft 12. The length of the threaded portion 56C of the inner surface 56B of the cam nut 56 and the length of the threaded segment 12C of the shaft 12 are preferably similar. In addition, the unthreaded portion 56D of the cam nut 56 which extends beyond the threaded portion 56C is preferably the same length as the distance between the end of the threaded segment 12C of the shaft 12 and the first portion 16A of the fixed jaw 16 mounted adjacent the distal end 12B of the shaft 12. Thus, in the preferred embodiment, the length of the threaded portion 56C and the unthreaded portion 56D are such that when the jaws 16 and 26 are in the completely closed position, the threaded segment 12C of the shaft 12 is completely engaged by the threaded portion 56C of the inner surface 56B of the cam nut 56 and the end of the cam nut 56 opposite the threaded portion 56C is adjacent to and in contact with the cam surface 40. In the preferred embodiment, the outside surface of the cam nut 56 has a diameter similar to that of the first portion 16A of the fixed jaw 16 and is provided with a checkered portion 56E to allow non-slip grasping of the cam nut 56 for easier rotation (FIG. 5).

IN USE

It is assumed that when not being used, the tool 10 is marginally in its completed closed position. Therefore, to prepare for use, the cam nut 56 of the tool 10 is rotated in a counterclockwise direction away from the cam surface 40. As the cam nut 56 is released, the C-clip 50 urges the moveable jaw 26 away from the fixed jaw 16 (FIG. 3). To achieve this upward movement, the moveable jaw 26 pivots about the pin 32 which holds the extension 26A in the slot 24 of the fixed jaw 16. If the expansion of the entrance 42A of the complete opening 42 caused the C-clip 50 is inadequate to accommodate the diameter of the stud 60 to be rethreaded, the moveable jaw 26 can be further moved away from the fixed jaw 16 by other means, such as by pulling on the moveable jaw 26 by hand. The entrance 42A of the complete opening 42 should be expanded to a diameter which is greater than the diameter of the stud 60 to be rethreaded such that the tool 10 easily slips over and around the end of the threaded member such as stud 60.

The tool 10 is then placed over the end of the stud 60 such that the thread dies 22 and 46 are adjacent the threads 62 of the stud 60. The expandable nature of the jaws 16 and 26 allows the thread dies 22 and 46 of the tool 10 to be positioned over any portion of the threads 62 of the stud 60. In the preferred embodiment, the tool 10 is positioned on the stud 60 such that the thread dies 22 and 46 are adjacent the inner threads 62A of the stud 60 thus ensuring that all of the threads 62 will be reconditioned (FIG. 3). In addition, inner threads 62A of a stud 60 tend to be used less, and are usually in better condition than the rest of the threads 62 of the stud 60. Therefore, by positioning the dies 22 and 46 within the inner threads 62A, the rethreading tool 10 is able to rethread all the threads 62 to closely match the original thread pattern.

After placement of the tool 10 on the stud 60, the cam nut 56 is rotated in a clockwise direction toward the cam surface 40. Although, a cam nut 56 is preferred, it is understood that other forms of a cam actuating member may be used, thus the cam member could be moved towards and away from the cam surface 40 by means other than rotation. In addition, under certain conditions it may be advantageous to form the cam nut 56 such that the cam nut 56 is released by rotating the cam nut 56 in a clockwise direction and tightened by rotating the cam nut 56 in a counterclockwise direction. As the cam nut 56 is tightened against the cam surface 40, the moveable jaw 26 is pivoted toward the fixed jaw 16 as a result of the contact of the cam nut 56 with the extension 26A of the moveable jaw 26 which projects beyond the slot 24 of the fixed jaw 16 toward the cam nut 56 when the moveable jaw 26 is in the expanded position (FIG. 3). The contact of the cam nut 56 with the extension 26A moves the extension 26A until the extension 26A is flush with the first portion 16A of the fixed jaw 16, thus making the cam surface 40 flat. In the completely closed position, the cam nut 56 is in full contact with the cam surface 40 and the cam surface 40 is completely flat, thus the extension 26A is fully within the slot 24 of the fixed jaw 16 (FIG. 2). In this position, the fixed jaw 16 and the moveable jaw 26 are fully together and form the complete circular opening 42 around the stud 60. As the cam nut 56 is tightened, the thread dies 22 and 46 help to align the tool 10 within the threads 62 of the stud 60 thus positioning the tool 10 in order to correctly rethread the threads 62. The tool 10 and the complete circular thread die 48 are able to be accurately positioned within the threads 62 of the stud 60 due to the individual thread dies 22 and 46 mounted in each jaw 16 and 26. By constructing the complete circular thread die 48 from two individual parts, the dies 22 and 46 are able to position themselves within the threads 62 of the stud 60 and align the tool 10 around the stud 60. Thus, as shown in FIG. 3, in the completely closed position the thread dies 22 and 46 are positioned accurately within the threads 62 of the stud 60. Once in place, the tool 10 is then rotated in a counterclockwise direction off of the stud 60. Preferably, the tool 10 is rotated by placing a socket wrench on the proximal end 12A of the shaft 12. After completing the rethreading, the waste material removed during the rethreading can be emptied out of the tool 10 and the threading dies 22 and 46 can be cleaned of all removed debris.

In an alternate method of use, the tool 10 can be first placed in the fully closed position and then the tool 10 can be rotated in a clockwise direction onto the threads 62 of the stud 60. To remove the tool 10, the tool 10 can be rotated in a counterclockwise direction as with the first method which serves to remove the tool 10 and rethread the threads 62 a second time. This method of removal may not be advisable if excess debris removed during the first rethreading remains in the tool 10, as the second rethreading may damage the thread dies 22 and 46 or the threads 62. Alternately, the tool 10 can be removed from the stud 60 by releasing the cam nut 56 which allows the C-clip 50 to move the moveable jaw 26 away from the fixed jaw 16, thus expanding the opening 42. If more expansion is needed, the previously discussed method of jaw expansion can be used.

Although the rethreading tool 10 is preferably used to rethread pipes, it is understood that the tool 10 can be used to rethread any object having threads adjacent a terminal end. The diameter of the complete opening 42 can be varied to accommodate different diameter pipes 60 by varying the size of the jaws 16 and 26 and the semi-circular channels 16E and 26B or by varying the size of the thread dies 22 and 46. In addition, the thread dies 22 and 46 may be varied to accommodate different sizes of threads 62, different lengths of threads 62 and the different positions of threads 62 on an object.

It is intended that the foregoing descriptions be only illustrative of the present invention and that the present invention be limited only by the hereinafter appended claims.

I claim:
1. A rethreading tool for a threaded member, which comprises:
   (a) a shaft having a proximal end and a distal end spaced apart along a longitudinal axis of the shaft;
   (b) a cam actuating means mounted around the shaft along the longitudinal axis of the shaft;
   (c) a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft;
   (d) a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis when the fixed jaw and the moveable jaw are mated together, wherein the moveable jaw has a cam surface adjacent to where the moveable jaw is pivotally mounted to the fixed jaw which is oriented towards the proximal end of the shaft and away from the distal end of the shaft so that the cam surface is engageable by the cam actuating means to bring the moveable jaw together with the fixed jaw; and
   (e) thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening and the tool can be rotated on the threaded member.

2. The tool of claim 1 wherein the part of the opening of the second portion of the fixed jaw and the part of the opening of the moveable jaw each have a first semi-circular groove wherein when the fixed jaw and the moveable jaw are mated together to form the complete opening, the semi-circular grooves mate to form a first annular groove around the longitudinal axis of the shaft in the complete opening and wherein the thread dies are mounted in the first semi-circular grooves of the fixed and moveable jaws.

3. The tool of claim 2 wherein the part of the opening of the second portion of the fixed jaw and the part of the opening of the moveable jaw each have a second semi-circular groove, wherein when the fixed jaw and the moveable jaw are mated together to form the complete opening, the second semi-circular grooves mate to form a second annular groove around the longitudinal axis of the shaft in the complete opening and wherein a C-clip is mounted in the second semi-circular grooves of the fixed and moveable jaws so as to bias the moveable jaw away from the fixed jaw when the jaws are mated together.

4. The tool of claim 3 wherein the second annular groove is spaced apart from the first annular groove toward the proximal end of the shaft along the longitudinal axis of the shaft.

5. The tool of claim 1 wherein the first portion of the fixed jaw has a slot parallel to the longitudinal axis of the shaft and the moveable jaw has an extension which mates with the slot of the fixed jaw, wherein a pin pivotally mounts the extension of the moveable jaw into the slot of the fixed jaw and wherein the extension of the moveable jaw extends beyond the slot of the fixed jaw toward the proximal end of the shaft to form the cam surface.

6. The tool of claim 1 wherein the threading dies are secured to the part of the opening of the fixed jaw and the part of the opening of the moveable jaw by screws through the jaws.

7. The tool of claim 1 wherein the proximal end of the shaft has a hexagonal cross-section for grasping with a wrench means for turning the tool on the threaded member.

8. A rethreading tool for a threaded member which comprises:
 (a) a shaft having a proximal end and a distal end spaced apart along a longitudinal axis of the shaft with threads along the shaft;
 (b) a rotatable member with internal threads mounted on the threads of the shaft;
 (c) a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft;
 (d) a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis of the shaft when the fixed jaw and the moveable jaw are mated together, wherein the moveable jaw has a cam surface adjacent to where the moveable jaw is pivotally mounted to the fixed jaw which is oriented towards the proximal end of the shaft and away from the distal end of the shaft so that the cam surface is engageable by the rotatable member to bring the moveable jaw together with the fixed jaw; and
 (e) thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening and the tool can be rotated on the threaded member.

9. The tool of claim 8 wherein the part of the opening of the second portion of the fixed jaw and the part of the opening of the moveable jaw each have a first semi-circular groove wherein when the fixed jaw and the moveable jaw are mated together to form the complete opening, the semi-circular grooves mate to form a first annular groove around the longitudinal axis of the shaft in the complete opening and wherein the thread dies are mounted in the first semi-circular grooves of the fixed and moveable jaws.

10. The tool of claim 9 wherein the part of the opening of the second portion of the fixed jaw and the part of the opening of the moveable jaw each have a second semi-circular groove, wherein when the fixed jaw and the moveable jaw are mated together to form the complete opening, the second semi-circular grooves mate to form a second annular groove around the longitudinal axis of the shaft in the opening and wherein a C-clip is mounted in the second semi-circular grooves of the fixed and the moveable jaw so as to bias the moveable jaw away from the fixed jaw when the jaws are mated together.

11. The tool of claim 10 wherein the second annular groove is spaced apart from the first annular groove toward the proximal end of the shaft along the longitudinal axis of the shaft.

12. The tool of claim 8 wherein the first portion of the fixed jaw has a slot parallel to the axis of the shaft and the moveable jaw has an extension which mates with the slot of the fixed jaw, wherein a pin pivotally mounts the extension of the moveable jaw in the slot of the fixed jaw and wherein the extension of the moveable jaw extends beyond the slot of the fixed jaw toward the proximal end of the shaft to form the cam surface.

13. The tool of claim 8 wherein the threading dies are secured to the part of the opening of the fixed jaw and the part of the opening of the moveable jaw by screws through the jaws.

14. The tool of claim 8 wherein the proximal end of the shaft has a hexagonal cross-section for grasping with a wrench means for turning the tool on the threaded member.

15. A rethreading tool for a threaded member which comprises:
 (a) a shaft having a proximal end and a distal end spaced apart along a longitudinal axis of the shaft and with threads along the shaft and with an enlarged portion providing a part of a fixed jaw at the distal end of the shaft having a part of an opening along and around the longitudinal axis;
 (b) a rotatable member with internal threads mounted on the threads on the shaft;
 (c) a moveable jaw pivotally mounted on the shaft with a part of an opening which mates together with the part of an opening of the enlarged portion of the shaft to provide a complete opening around the longitudinal axis when the jaws and enlarged portion are mated together, wherein the moveable jaw has a cam surface adjacent to where the jaw is pivotally mounted which is oriented towards the proximal end of the shaft and away from the enlarged portion of the shaft so that the cam portion is engageable by the rotatable member to bring the moveable jaw together with the enlarged portion;
 (d) thread dies mounted in the part of the opening of the enlarged portion of the shaft and the part of the opening of the moveable jaw around the longitudinal axis of the shaft so that the dies rethread the threaded member when the enlarged portion of the shaft and moveable jaw are mated together to form the complete opening and the tool can be rotated on the threaded member; and
 (e) resilient means mounted in the part of the openings of the moveable jaw and enlarged portion of the shaft which bias the moveable jaw away from the enlarged portion of the shaft when the rotatable member is disengaged from the cam portion.

16. The tool of claim 15 wherein the part of the opening of the enlarged portion of the shaft and the part of the opening of the moveable jaw each have a first semi-circular groove wherein when the enlarged portion of the shaft and the moveable jaw are mated together to form the complete opening, the semi-circular grooves mate to form a first annular groove around the longitudinal axis of the shaft in the complete opening and wherein the thread dies are mounted in the first semi-circular grooves of the enlarged portion of the shaft and the moveable jaw.

17. The tool of claim 16 wherein the part of the opening of the enlarged portion of the shaft and the part of the opening of the moveable jaw each have a second semi-circular groove wherein when the enlarged portion of the shaft and the moveable jaw are mated together to form the complete opening, the semi-circular grooves mate to form a second annular groove around the longitudinal axis of the shaft in the complete opening and wherein the resilient means is mounted in the second semi-circular grooves of the enlarged portion of the shaft and the moveable jaw so as to bias the moveable jaw away from the enlarged portion of the shaft when the enlarged portion and the moveable jaw are mated together.

18. The tool of claim 17 wherein the second annular groove is spaced apart from the first annular groove toward the proximal end of the shaft along the longitudinal axis of the shaft.

19. The tool of claim 15 wherein the moveable jaw is pivotally connected to the enlarged section of the shaft by a pin.

20. The tool of claim 15 wherein the rethreading dies are secured in the part of the openings of the enlarged section of the shaft and the moveable jaw by screws through the enlarged section and the moveable jaw.

21. The tool of claim 15 wherein the proximal end of the shaft has a hexagonal cross-section for grasping with a wrench means for turning the tool on the threaded member.

22. The tool of claim 17 wherein the resilient means is a C-clip.

23. A method for rethreading the threads of a threaded member, which comprises:
(a) a shaft having a proximal end and a distal end spaced apart along a longitudinal axis of the shaft; a cam actuating means mounted around the shaft along the longitudinal axis of the shaft; a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft; a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis when the fixed jaw and the moveable jaw are mated together, wherein the moveable jaw has a cam surface adjacent to where the moveable jaw is pivotally mounted to the first jaw which is oriented towards the proximal end of the shaft and away from the distal end of the shaft so that the cam surface is engageable by the cam means to bring the moveable jaw together with the fixed jaw; and thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening;

(b) mounting the rethreading tool on the threaded member;
(c) rotating the cam means toward the cam surface of the moveable jaw to position the complete opening formed by the fixed jaw and the moveable jaw and the thread dies around the threaded member; and
(d) rotating the rethreading tool around the threaded member to rethread the threads of the threaded member.

24. The method of claim 23 wherein the tool is rotated in a counterclockwise direction.

25. The method of claim 23 wherein the tool is rotated by grasping the proximal end of the shaft with a wrench means.

26. The method of claim 23 wherein the proximal end of the shaft has a hexagonal cross-section which is engaged by a socket of a wrench to rotate the tool.

27. The method of claim 23 wherein the tool is mounted on the threaded member by positioning the threading dies adjacent the threads of the threaded member and then rotating the cam means against the cam surface to close the moveable jaw against the fixed jaw.

28. A method for reconditioning and rethreading the threads of a threaded member, which comprises:
(a) providing a rethreading tool including a shaft having a proximal end and a distal end spaced apart along a longitudinal axis of the shaft with threads along the shaft; a rotatable member with internal threads mounted on the threads of the shaft; a fixed jaw having a first portion and a second portion wherein the first portion is provided on the distal end of the shaft and the second portion extends outward from the first portion away from the distal end of the shaft, the fixed jaw having a part of an opening extending from the first portion and through the second portion so as to be along and around the longitudinal axis of the shaft; a moveable jaw pivotally mounted on the first portion of the fixed jaw having a part of an opening along and around the longitudinal axis of the shaft that mates together with the part of the opening of the second portion of the fixed jaw to provide a complete opening around the longitudinal axis when the fixed jaw and the moveable jaw are mated together, wherein the moveable jaw has a cam surface adjacent to where the moveable jaw is pivotally mounted to the fixed jaw which is oriented towards the proximal end of the shaft and away from the distal end of the shaft so that the cam surface is engageable by the rotatable member to bring the moveable jaw together with the fixed jaw; and thread dies mounted in the part of the opening of the fixed jaw and the part of the opening of the moveable jaw around the longitudinal axis of the shaft so that the dies rethread the threaded member when the fixed jaw and the moveable jaw are mated together to form the complete opening;
(b) mounting the rethreading tool on the threaded member;
(c) rotating the rotatable member toward the cam surface of the moveable jaw to position the complete opening formed by the fixed jaw and the moveable jaw and the thread dies around the threaded member; and (d) rotating the rethreading tool around the threaded member to rethread the threads of the threaded member.

29. The method of claim 28 wherein the tool is rotated in a counterclockwise direction.

30. The method of claim 28 wherein the tool is rotated by grasping the proximal end of the shaft with a wrench means.

31. The method of claim 28 wherein the proximal end of the shaft has a hexagonal cross-section which is engaged by a socket of a wrench to rotate the tool.

32. The method of claim 28 wherein the tool is mounted on the threaded member by positioning the threading dies adjacent the threads of the threaded member and then rotating the rotatable member against the cam surface to close the moveable jaw against the fixed jaw.

* * * * *